United States Patent
Hayashi

(10) Patent No.: US 11,438,532 B2
(45) Date of Patent: Sep. 6, 2022

(54) IMAGE CAPTURING APPARATUS CAPABLE OF OBTAINING PROPER EXPOSURE IN SHORT TIME, METHOD OF CONTROLLING SAME, AND STORAGE MEDIUM

(71) Applicant: CANON KABUSHIKI KAISHA, Tokyo (JP)

(72) Inventor: Akari Hayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/373,220

(22) Filed: Jul. 12, 2021

(65) Prior Publication Data
US 2022/0021825 A1 Jan. 20, 2022

(30) Foreign Application Priority Data
Jul. 20, 2020 (JP) .............................. JP2020-123846

(51) Int. Cl.
H04N 5/355 (2011.01)
H04N 5/341 (2011.01)
H04N 5/378 (2011.01)

(52) U.S. Cl.
CPC ............ *H04N 5/355* (2013.01); *H04N 5/341* (2013.01); *H04N 5/378* (2013.01)

(58) Field of Classification Search
CPC ........ H04N 5/355; H04N 5/341; H04N 5/378; H04N 5/2353; H04N 5/2356; H04N 5/353; H04N 5/35536
See application file for complete search history.

(56) References Cited

U.S. PATENT DOCUMENTS

| | | | |
|---|---|---|---|
| 8,842,190 B2* | 9/2014 | Chen | G06T 3/4038 |
| | | | 348/222.1 |
| 10,567,668 B2* | 2/2020 | Nakamura | H04N 5/2351 |
| 2013/0121525 A1* | 5/2013 | Chen | G06T 3/4038 |
| | | | 382/305 |
| 2019/0246024 A1* | 8/2019 | Nakamura | H04N 5/915 |

FOREIGN PATENT DOCUMENTS

| | | |
|---|---|---|
| JP | 11-341342 A | 12/1999 |
| JP | 2015-177301 A | 10/2015 |

* cited by examiner

*Primary Examiner* — Nicholas G Giles
(74) *Attorney, Agent, or Firm* — Cowan, Liebowitz & Latman, P.C.

(57) ABSTRACT

An image capturing apparatus includes an image capturing device capable of performing a plurality of charge accumulation operations within the same time period of a vertical synchronization signal. A follow-up control value and a first predicted control value which is more distant from a current control value than the follow-up control value in a direction of change are set based on a photometry result using the current control value. When at least one of proper differences between the follow-up control value and the first predicted control and respective photometric values obtained therewith is not larger than a predetermined allowable value, the photometric value associated therewith is determined as a proper exposure. The current control value is an initial value or one of the photometric values in a case where the proper differences are both larger than the predetermined allowable value.

19 Claims, 7 Drawing Sheets

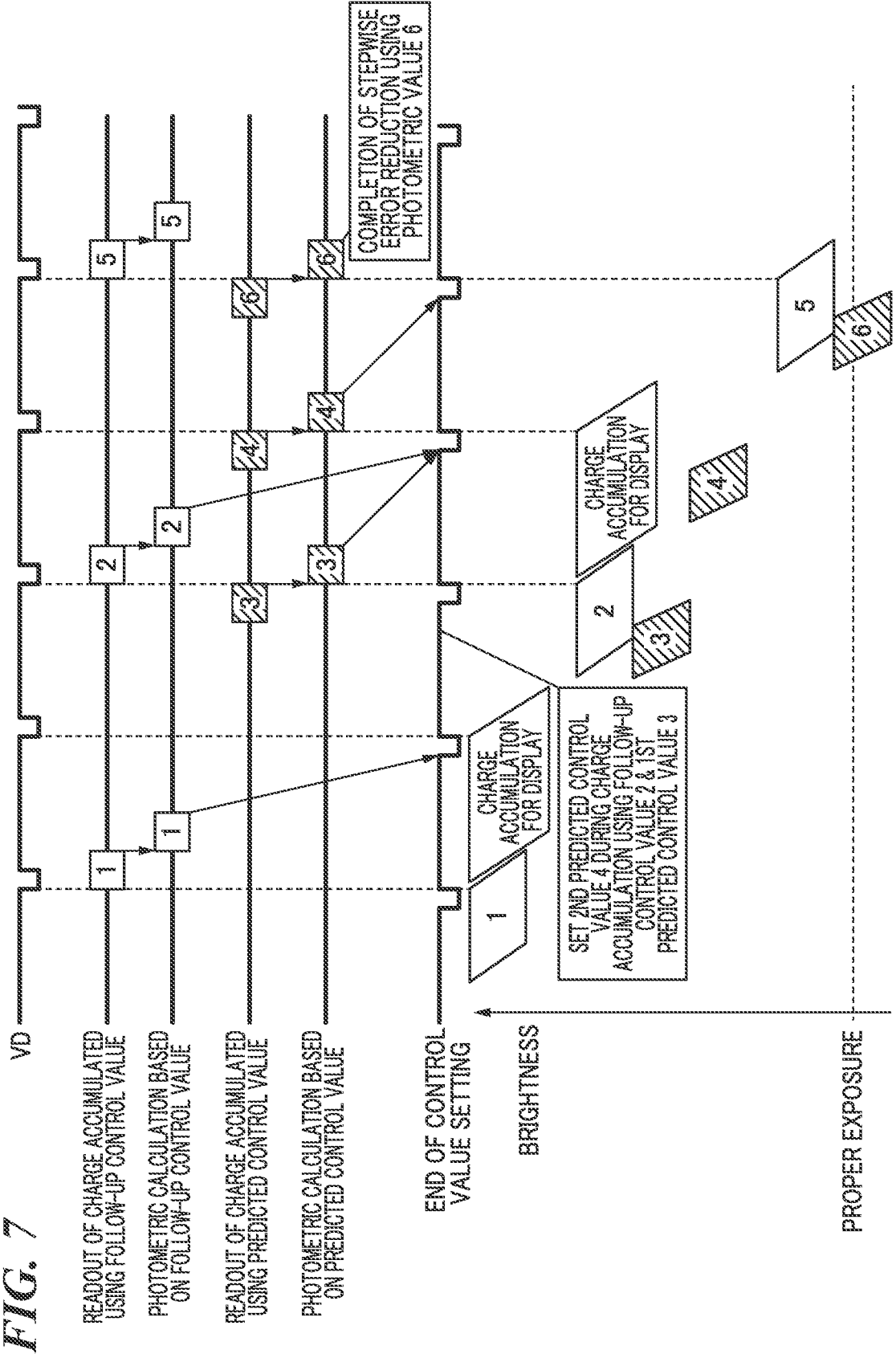

IMAGE CAPTURING APPARATUS CAPABLE OF OBTAINING PROPER EXPOSURE IN SHORT TIME, METHOD OF CONTROLLING SAME, AND STORAGE MEDIUM

BACKGROUND OF THE INVENTION

Field of the Invention

The present invention relates to an image capturing apparatus, a method of controlling the same, and a storage medium.

Description of the Related Art

In AE (auto exposure) control performed by an image capturing apparatus equipped with an image capturing sensor, such as a CCD or CMOS sensor, electric charges are accumulated in the image capturing sensor according to an exposure control value, and calculation of a proper exposure value (photometric calculation) is performed according to signals based on the accumulated electric charges. However, if the exposure control value is not suitable for the brightness of an object, there is a case where gradation saturation caused by the charge accumulation occurs due to the influence of the dynamic range of the image capturing sensor, which makes it impossible to calculate an exposure value with high accuracy. As a method of solving this problem, there is a method referred to as the "stepwise error reduction" in which a photometric calculation is repeated by setting an optimum control value based on a photometric value obtained by a photometric calculation, and it is possible to calculate an exposure condition with higher accuracy (increase the AE accuracy) by performing the stepwise error reduction.

However, when the stepwise error reduction is performed to increase the AE accuracy, it take time to obtain a proper exposure, which sometimes causes such a problem that the photographing timing is missed or the accuracy of focusing on an object is lowered. On the other hand, in a case where the stepwise error reduction is not performed so as to prevent these problems, the AE accuracy is reduced as mentioned above.

Under such circumstances, there is a demand for a technique that improves a trade-off relation between merits and demerits caused by performing the stepwise error reduction and reduces time taken to acquire a proper exposure while keeping the required AE accuracy. As related art concerning this problem, Japanese Laid-Open Patent Publication (Kokai) No. H11-341342, for example, has proposed a technique for calculating a proper exposure from a plurality of photometry results obtained by changing the exposure for each vertical synchronization signal (VD) during AF (auto focus) search. Further, Japanese Laid-Open Patent Publication (Kokai) No. 2015-177301 has proposed a technique for reducing time taken to obtain a proper exposure by setting a plurality of control values predicted during the same VD and thereby acquiring a plurality of results of charge accumulation.

In the technique described in Japanese Laid-Open Patent Publication (Kokai) No. H11-341342, although the stepwise error reduction is performed during AF search, the stepwise error reduction time itself is not reduced. Further, there is a problem that if the stepwise error reduction is performed during AF search using an image capturing sensor, which is the same sensor used for both AF and AE, the AF accuracy varies depending on exposure variation in AE.

Further, in the technique described in Japanese Laid-Open Patent Publication (Kokai) No. 2015-177301, a plurality of charge accumulation operations are performed using a plurality of control values set in advance. For this reason, in a case where the set control value deviates from a control value at which a proper exposure is obtained, it sometimes takes more time to obtain a proper exposure value than in a case where the stepwise error reduction is performed.

SUMMARY OF THE INVENTION

The present invention provides an image capturing apparatus that is capable of reducing time taken to acquire a proper exposure and obtaining high AE accuracy, a method of controlling the same, and a storage medium.

In a first aspect of the present invention, there is provided an image capturing apparatus including an image capturing device that is capable of performing a plurality of charge accumulation operations within the same time period of a vertical synchronization signal, a drive control unit configured to control driving of the image capturing device, and an exposure control unit configured to obtain a proper exposure using image signals output from the image capturing device, the exposure control unit including a setting unit configured to set, based on a photometry result obtained using a current control value, a follow-up control value and a first predicted control value which is more distant from the current control value than the follow-up control value in a direction of change from the current control value to the follow-up control value, for performing charge accumulation operations in the image capturing device within the same time period of the vertical synchronization signal, a determination unit configured to determine whether or not at least one of a proper difference between the follow-up control value and a photometric value as a photometry result obtained using the follow-up control value and a proper difference between the first predicted control value and a photometric value as a photometry result obtained using the first predicted control value is not larger than a predetermined allowable value, and a decision unit configured to decide a photometric value associated with a proper difference not larger than the predetermined allowable value as a proper exposure, wherein the current control value is an initial value or one of the photometric values obtained using the follow-up control value and the first predicted value, respectively, in a case where the proper differences are both larger than the predetermined allowable value.

In a second aspect of the present invention, there is provided an image capturing apparatus including an image capturing device, a drive control unit configured to control driving of the image capturing device, a photometry unit configured to perform photometry based on signals obtained by performing charge accumulation using the image capturing device, and an exposure control unit configured to control an exposure control value at the time of image capturing of an object using the image capturing device, wherein the drive control unit controls driving of the image capturing device such that in one frame period between successive synchronization signals, charge accumulation is performed at a first timing synchronized with a synchronization signal and at a second timing different from the first timing, and that first charge accumulation performed at the first timing and second charge accumulation performed at the second timing are executed in different areas of the image capturing device, and wherein in a case where a photometry result based on signals obtained by the first charge accumulation is not a proper exposure, the exposure control unit determines, in the next frame period, an exposure control value at the time of image capturing of the object, using results of photometry performed by the photometry unit based on signals obtained by the first charge accumulation and signals obtained by the second charge accumulation.

In a third aspect of the present invention, there is provided a method of controlling an image capturing apparatus including an image capturing device that is capable of performing a plurality of charge accumulation operations within the same time period of a vertical synchronization signal, wherein a process for determining a proper exposure using image signals output from the image capturing device includes setting, based on a photometry result obtained using a current control value, a follow-up control value and a first predicted control value which is more distant from the current control value than the follow-up control value in a direction of change from the current control value to the follow-up control value, for performing charge accumulation operations in the image capturing device within the same time period of the vertical synchronization signal, determining whether or not at least one of a proper difference between the follow-up control value and a photometric value as a photometry result obtained using the follow-up control value and a proper difference between the first predicted control value and a photometric value as a photometry result obtained using the first predicted control value is not larger than a predetermined allowable value, and deciding a photometric value associated with a proper difference not larger than the predetermined allowable value as a proper exposure, and wherein the current control value is an initial value or one of the photometric values obtained using the follow-up control value and the first predicted value, respectively, in a case where the proper differences are both larger than the predetermined allowable value.

In a fourth aspect of the present invention, there is provided a method of controlling an image capturing apparatus including an image capturing device, including controlling driving of the image capturing device, and controlling an exposure control value at the time of image capturing of an object using the image capturing device, wherein the controlling of the driving includes performing, in one frame period between successive synchronization signals, charge accumulation at a first timing synchronized with a synchronization signal and at a second timing different from the first timing, and also executing first charge accumulation performed at the first timing and second charge accumulation performed at the second timing, in different areas of the image capturing device, and wherein the controlling of the exposure control value includes, in a case where a photometry result based on signals obtained by the first charge accumulation is not a proper exposure, determining, in the next frame period, an exposure control value at the time of image capturing of the object, using results of photometry performed based on signals obtained by the first charge accumulation and signals obtained by the second charge accumulation.

According to the present invention, it is possible to reduce time taken to acquire a proper exposure and obtain high AE accuracy.

Further features of the present invention will become apparent from the following description of exemplary embodiments (with reference to the attached drawings).

BRIEF DESCRIPTION OF THE DRAWINGS

FIG. 7 is a timing diagram of the exposure control process according to the second embodiment.

DESCRIPTION OF THE EMBODIMENTS

The present invention will now be described in detail below with reference to the accompanying drawings showing embodiments thereof.

Figure 1:
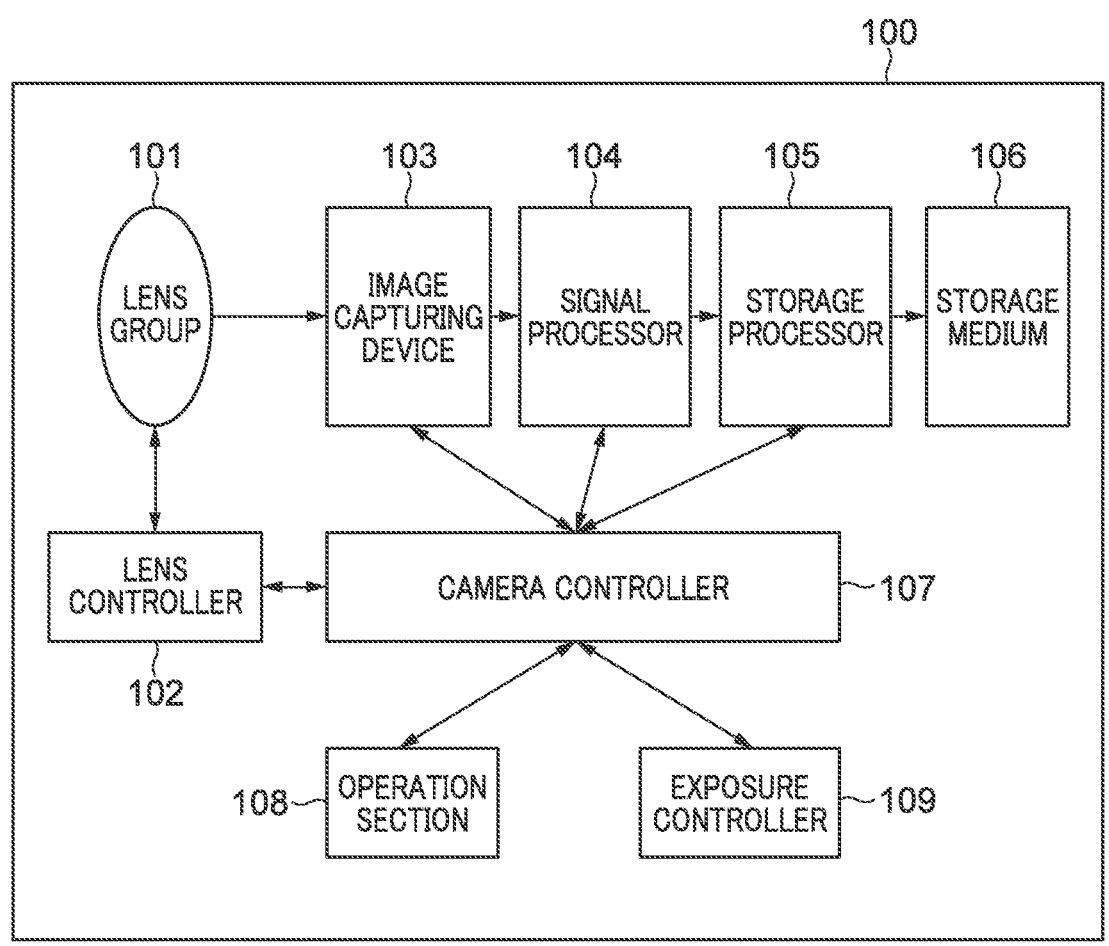
FIG. 1 is a schematic block diagram of an image capturing apparatus according to embodiments.

FIG. 1 is a schematic block diagram of an image capturing apparatus 100 according to embodiments of the present invention. The image capturing apparatus 100 is, specifically, a digital camera or digital video camera, but is not limited to this, and may be any of various electronic apparatuses equipped with an image capturing function using an image capturing device, such as a smartphone, a tablet PC, and a portable game machine.

The image capturing apparatus 100 includes a lens group 101, a lens controller 102, an image capturing device 103, a signal processor 104, a storage processor 105, a storage medium 106, a camera controller 107, an operation section 108, and an exposure controller 109.

The lens group 101 includes a mechanism for controlling exposure using a diaphragm and a light reduction filter, and lenses and a drive mechanism for performing a focusing operation (focus adjustment) and a zooming operation, and causes incident light from an object to form an image on the image capturing device 103. The lens controller 102 controls the lens group 101 to perform the exposure control, the focusing operation, and the zooming operation according to commands received from the camera controller 107.

The image capturing device 103 is e.g. a CCD or CMOS sensor. The image capturing device 103 converts an optical image formed on its imaging surface to analog signals by photoelectric conversion, further converts the analog signals to image signals formed by digital signals, and outputs the image signals to the signal processor 104. The signal processor 104 performs luminance correction, such as gain correction, color correction, such as white balance correction, and other predetermined signal processing, on the image signals acquired from the image capturing device 103 to thereby generate image data, and sends the generated image data to the storage processor 105.

The storage processor 105 converts the image data sent from the signal processor 104 to data of a format which can be stored in the storage medium 106, further, performs necessary compression processing, etc. on the image data, and writes the compressed image data into the storage medium 106. Note that the format conversion of image data may be performed by the signal processor 104. Examples of the storage medium 106 include a semiconductor storage device (EEPROM) built in the image capturing apparatus 100 and an SD card which can be removably attached to the image capturing apparatus 100, but the storage medium 106 is not limited to these, and any other suitable known storage medium can be used.

The operation section 108 includes buttons, switches, a touch panel, etc., for receiving an operation from a user. The camera controller 107 is a so-called microcomputer and receives an input from the operation section 108 to control the overall operation of the image capturing apparatus 100. For example, when photographing is instructed via the operation section 108, the camera controller 107 instructs the exposure controller 109 to perform exposure calculation. Then, the camera controller 107 instructs the lens controller 102 to drive the diaphragm and change the light reduction filter based on a result of the exposure calculation, acquired from the exposure controller 109. Further, the camera controller 107 performs the driving control of the image capturing device 103 for the image capturing operation (such as the control of a charge accumulation time period, the control of an amplification ratio of electrical signals, and so forth). Then, the camera controller 107 controls a series of image processing operations performed on the image signals output from the image capturing device 103 in accordance with the image capturing operation. The exposure controller 109 acquires various settings (hereinafter referred to as the "camera settings") concerning exposure of the image capturing apparatus 100, from the camera controller 107, to perform the exposure calculation, and sends a result of the exposure calculation to the camera controller 107. Details of the exposure controller 109 will be described hereinafter.

Note that the functions of the lens controller 102, the signal processor 104, the storage processor 105, the camera controller 107, and the exposure controller 109 may be realized by hardware or may be realized by a CPU that executes predetermined programs (by software). Further, although the exposure controller 109 is separate from the functions of the camera controller 107 because the exposure controller 109 is a characterizing portion of the configuration of the image capturing apparatus 100, the camera controller 107 may be equipped with the function of the exposure controller 109.

Figure 2:
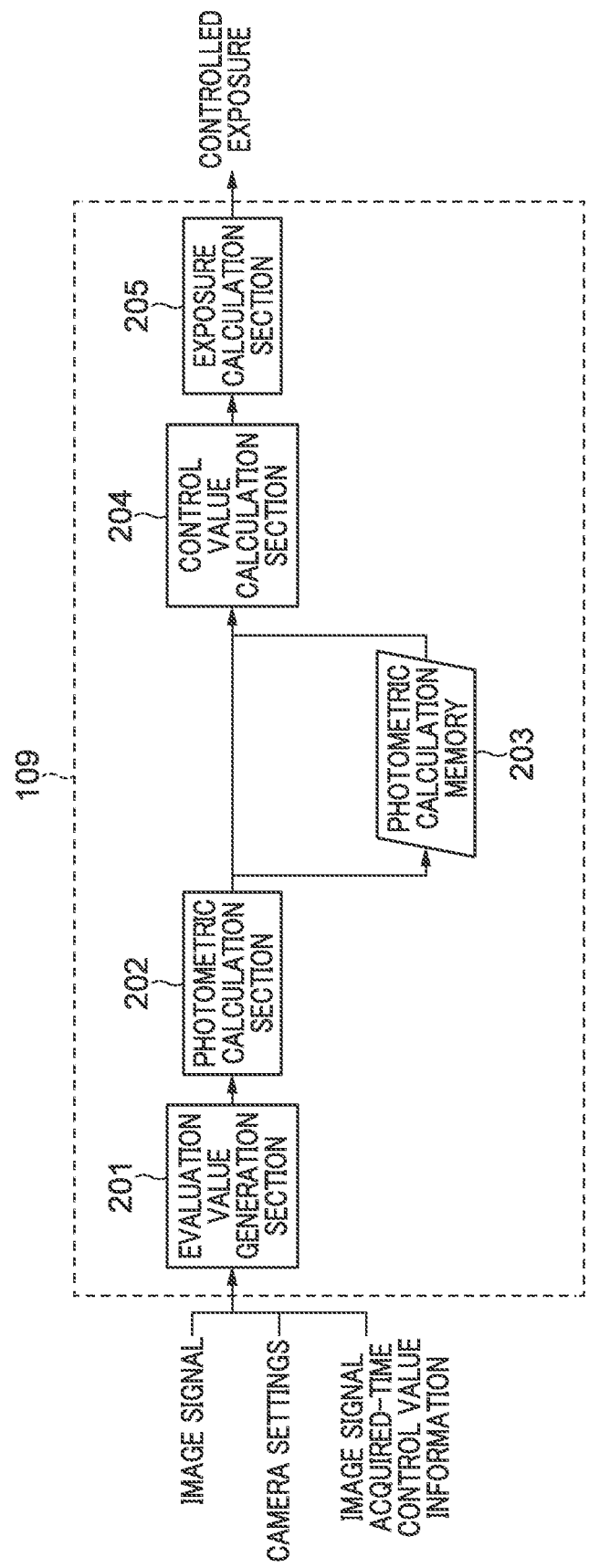
FIG. 2 is a block diagram of an exposure controller of the image capturing apparatus shown in FIG. 1.

FIG. 2 is a block diagram of the exposure controller 109. The exposure controller 109 includes an evaluation value generation section 201, a photometric calculation section 202, a photometric calculation memory 203, a control value calculation section 204, and an exposure calculation section 205.

Image signals, information on a control value at the time of electric charge accumulation performed to generate the image signals (hereinafter referred to as the "control value information at the time of acquiring image signals"), and the camera settings are input to the evaluation value generation section 201. The evaluation value generation section 201 sets an evaluation frame for calculating signal values of color components, generates an evaluation value, and sends the generated evaluation value to the photometric calculation section 202. The photometric calculation section 202 performs a photometric calculation based on the camera settings using the evaluation value acquired from the evaluation value generation section 201. The photometric calculation result (photometry result) generated by the photometric calculation section 202 and the control value information at the time of acquiring image signals are stored and accumulated in the photometric calculation memory 203 in a state associated with each other (so as to indicate the corresponding relationship). The next control value is calculated by the control value calculation section 204 based on a plurality of photometric calculation results and a plurality of items of the control value information at the time of acquiring image signals, which have been stored in the photometric calculation memory 203 as described above. The next control value can be generated in plurality, and details thereof will be described hereinafter with reference to FIGS. 4 to 7. The exposure calculation section 205 determines an exposure setting based on the next control value and the camera settings and notifies the camera controller 107 of the determined exposure setting. Note that the control value information at the time of acquiring image signals includes information on a charge accumulation time period of the image capturing device 103, information on a photographic sensitivity (a digital gain may be included besides an analog gain), and information on an aperture value related to an opening diameter of the diaphragm, not shown, included in the lens group 101.

Figure 3:
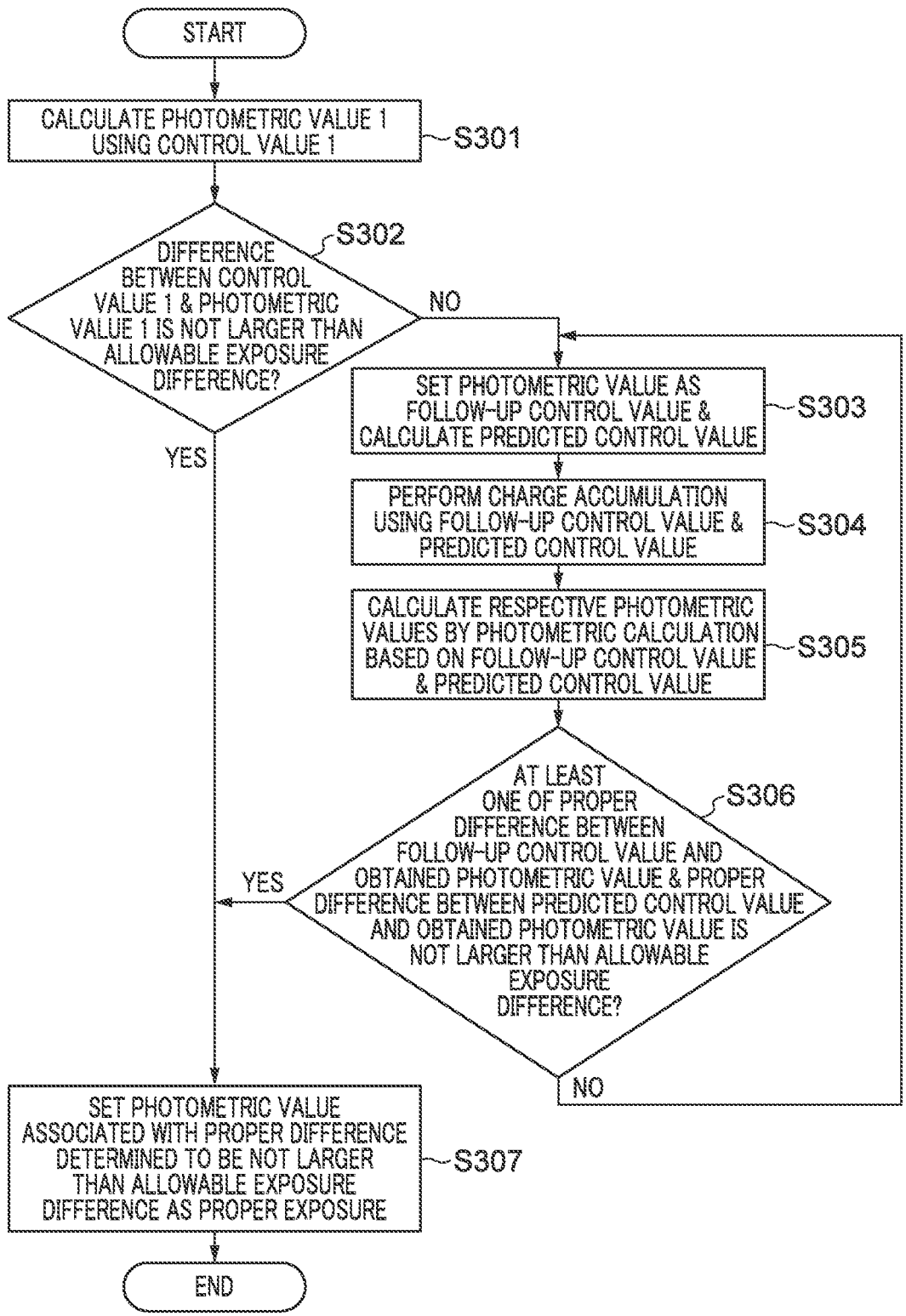
FIG. 3 is a flowchart of an exposure control process according to a first embodiment.
Figure 4:
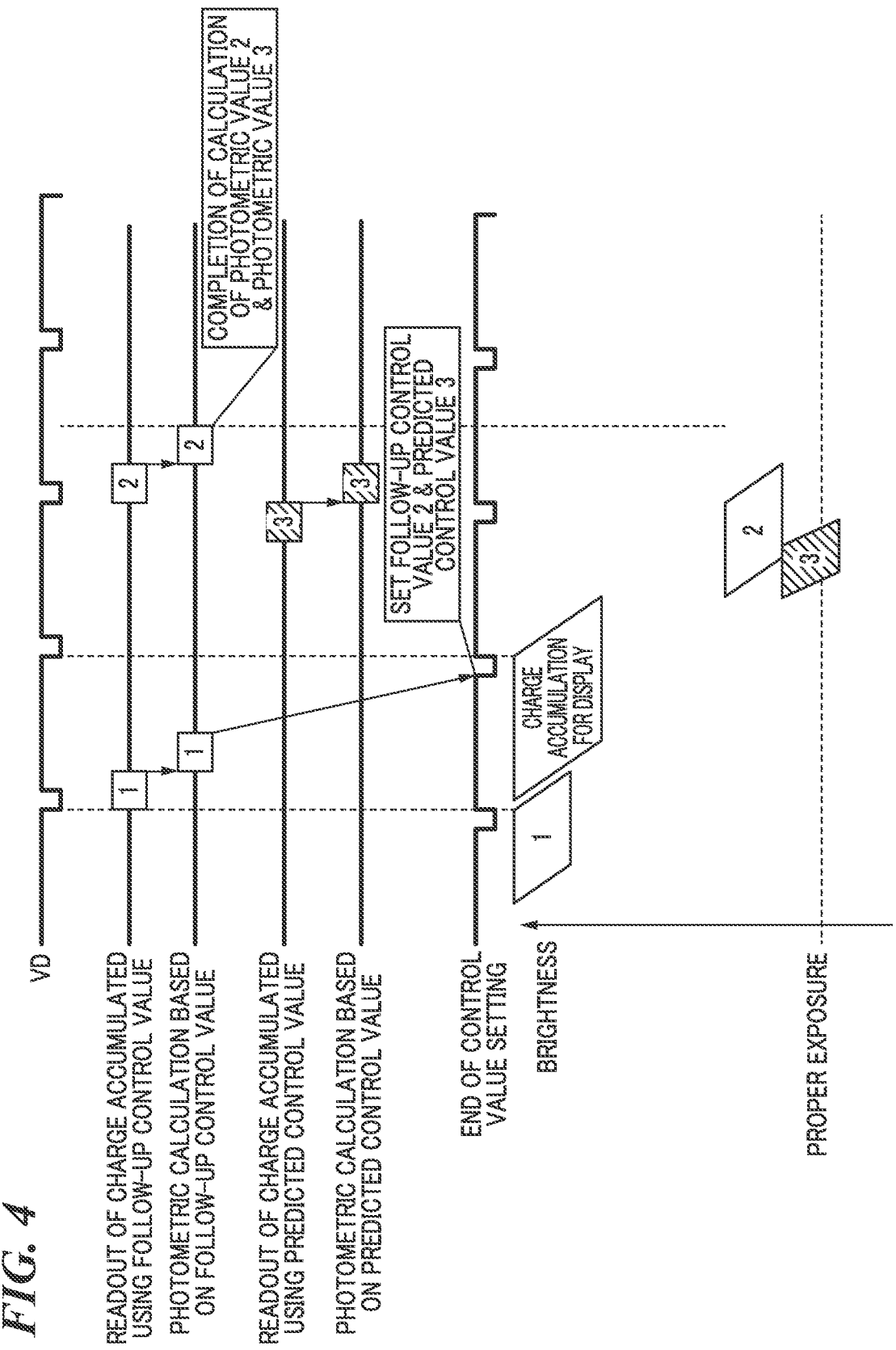
FIG. 4 is a timing diagram of the exposure control process according to the first embodiment.

Next, an exposure control method (stepwise error reduction control) according to a first embodiment, used in the image capturing apparatus 100, will be described with reference to FIGS. 3 and 4. FIG. 3 is a flowchart of an exposure control process from the start of exposure followup to the determination of a proper exposure by the exposure control method according to the first embodiment. The operations of steps of the exposure control process in FIG. 3 are realized by the camera controller 107 that executes a predetermined program and comprehensively controls the operations of the components of the image capturing apparatus 100. FIG. 4 is an example of the timing diagram of the exposure control process according to the first embodiment.

When the image capturing apparatus 100 is started up, in a step S301, the camera controller 107 performs charge accumulation (exposure) in the image capturing device 103 using an initial value of the control value designated in advance (hereinafter referred to as the "control value 1") according to a vertical synchronization signal (VD). Then, the exposure controller 109 calculates a photometric value 1 by performing the photometric calculation based on the control value 1 and signals obtained by charge accumulation. Note that a time period from an output of one vertical synchronization signal to an output of the next vertical synchronization signal, which are sequential, is defined as one frame period in image capturing of an object using the image capturing device 103.

Here, the control value (exposure control value) and the photometric value for the exposure control in the present embodiment are only required to be determined based on values of By (brightness value) expressed in a so-called APEX (Additive System of Photographic Exposure) system. More specifically, the control value and the photometric value are only required to be configured such that a difference in brightness corresponding to a By value of 1 in the APEX system correspond to a difference of one stop in each of exposure parameters (an accumulation time Tv, a photographic sensitivity Sv, and an aperture value Av) included in the control value. Note that the exposure control value and the photometric value may be controlled by a unit system different from the above-mentioned APEX system.

In a step S302, the camera controller 107 determines whether or not the photometric value 1 is a proper exposure, using a proper difference. The proper difference refers to a difference between the control value and the photometric value, and in a case where the proper difference is small, the gradation saturation does not change, and hence it is possible to calculate a proper exposure. The photometric value (photometry result) calculated by photometric calculation changes depending on the control value (exposure control value) used at the time of image capturing of an object. For this reason, if the control value used at the time of image capturing of an object largely deviates from the exposure reference (target exposure) determined in the image capturing apparatus 100 in advance such that an image of an object is captured at a proper brightness, a difference between the photometric value as a result of photometric calculation and the control value also becomes large. Therefore, whether or not the photometric value 1 is a proper exposure is determined depending on whether or not the proper difference is not larger than an allowable value. Assuming that the allowable value of the proper difference (allowable exposure difference) is represented by "Diff", the allowable value Diff can be calculated by the following equation (1). In this equation, "Range" represents the number of stops indicative of a width of the dynamic range of the image capturing device 103, and "Limit" represents an allowable value of an AE photometry error. By using the allowable value Diff, it is possible to cause the performance of the image capturing device 103 and the necessary AE accuracy to be reflected on the stepwise error reduction.

$$Diff = \frac{\text{Range}}{2} \times \text{Limit} \quad (1)$$

If it is determined that the proper difference between the control value 1 and the photometric value 1 is not larger than the allowable value Diff (the photometric value 1 is a proper exposure) (YES to the step S302), the camera controller 107 proceeds to a step S307. In the step S307, the camera controller 107 determines the photometric value associated with the proper difference determined to be not larger than the allowable value Diff as a proper exposure and terminates the stepwise error reduction. In a case where the process proceeds from the step S302 to the step S307, the photometric value 1 is set as the proper exposure.

On the other hand, if it is determined that the proper difference between the control value 1 and the photometric value 1 is larger than the allowable value Diff (the photometric value 1 is not a proper exposure) (NO to the step S302), the camera controller 107 proceeds to a step S303. Note that FIG. 4 shows a case where the photometric value 1 is determined to deviate from a proper exposure and is brighter than the proper exposure, so that the process proceeds from the step S302 to the step S303.

The step S303 and steps S304 to S306 will be specifically described with respect to a case where the process first proceeds from the step S302 to the step S303. In the step S303, the camera controller 107 sets the photometric value 1 obtained by the control value 1 as the next control value (hereinafter referred to as the "follow-up control value 2"). Further, in the step S303, the camera controller 107 sets a control value shifted in a direction of change from the control value 1 to the follow-up control value 2 based on the allowable value Diff (hereinafter referred to as the "predicted control value 3"). Note that considering a case where the routine of the steps S303 to S306 is repeated, in FIG. 3, "photometric value", "follow-up control value", and "predicted control value" are denoted without any suffix numbers.

Assuming that the predicted control value 3 is represented by Bvp, the follow-up control value 2 by $Bv_S$, and the control value 1 by Bv', the predicted control value 3 can be calculated by the following equation (2) using these values and the allowable value Diff. At this time, in the present embodiment, the predicted control value 3 is set such that it changes from the follow-up control value 2 with a width of change which is twice the allowable value Diff $$Bv_P = Bv_S + 2 \times \frac{Bvs - Bv'}{|Bvs - Bv'|} \times Diff \quad (2)$$

In the step S304, the camera controller 107 performs charge accumulation operations using the follow-up control value 2 and the predicted control value 3. The charge accumulation operations using the follow-up control value 2 and the predicted control value 3 can be performed within the same time period of the next VD signal after termination of photometric calculation using the control value 1. When the charge accumulation operations using the follow-up control value 2 and the predicted control value 3 are completed, the electric charges accumulated thereby are read out at different timings, respectively, as shown in FIG. 4. In the step S305, the exposure controller 109 calculates a photometric value 2 by photometric calculation based on the follow-up control value 2 and the result of charge accumulation using the follow-up control value 2, and further, calculates a photometric value 3 by photometric calculation based on the predicted control value 3 and the result of charge accumulation using the predicted control value 3. Note that as shown in FIG. 4, the photometric calculation is performed immediately after completion of each charge accumulation operation.

Here, in a case where readout of electric charges accumulated using the follow-up control value 2 and readout of the electric charge accumulated using the predicted control value 3 are controlled to be executed at the different timings, readout of the electric charge accumulated using the predicted control value 3 is controlled to be completed first. This is because the comparison operation can be performed immediately after the photometric calculation with respect to the follow-up control value 2, whereby in a case where the sequence of the image capturing operation and so forth is changed, it is possible to reduce a time lag before the start of exposure.

In the step S306, the camera controller 107 determines whether or not at least one of a proper difference between the follow-up control value 2 and the photometric value 2 and a proper difference between the predicted control value 3 and the photometric value 3 is not larger than the allowable value Diff. That is, whether or not at least one of the photometric value 2 and the photometric value 3 is a proper exposure. The determination method used in the step S306 is the same as that used in the step S302, and hence description thereof is omitted.

If it is determined that at least one of the proper difference between the follow-up control value 2 and the photometric value 2 and the proper difference between the predicted control value 3 and the photometric value 3 is not larger than the allowable value Diff (YES to the step S306), the camera controller 10 proceeds to the step S307. In the step S307, the camera controller 107 determines the photometric value associated with the proper difference determined to be not larger than the allowable value Diff as a proper exposure, followed by terminating the stepwise error reduction. Note that in a case where there are a plurality of photometric values determined as the proper exposure (in a case where there are a plurality of proper differences not larger than the allowable value Diff), it is desirable to execute the step S307 by determining a photometric value which is smaller in the proper difference as the proper exposure.

On the other hand, if both of the proper difference between the follow-up control value 2 and the photometric value 2 and the proper difference between the predicted control value 3 and the photometric value 3 are larger than the allowable value Diff (NO to the step S306), the camera controller 107 returns to the step S303. Thus, the loop of the steps S303 to S306 is repeated until a proper exposure is obtained. Note that FIG. 4 shows an example in which it is determined that the photometric value 2 is not a proper exposure, and the photometric value 3 is a proper exposure.

In the present embodiment, in the step S303 after the process returns thereto, one of the two photometric values as the targets of the determination in the immediately preceding step S306, which is more distant in the direction of change in the control value, is set as the next follow-up control value, and the next predicted control value is calculated and set. However, it is not necessarily required to set one of the two photometric values as the targets of the determination in the immediately preceding step S306, which is more distant in the direction of change in the control value, as the next follow-up control value, and for example, a photometric value obtained using the current follow-up control value may be always set as the next follow-up control value.

Figure 5:
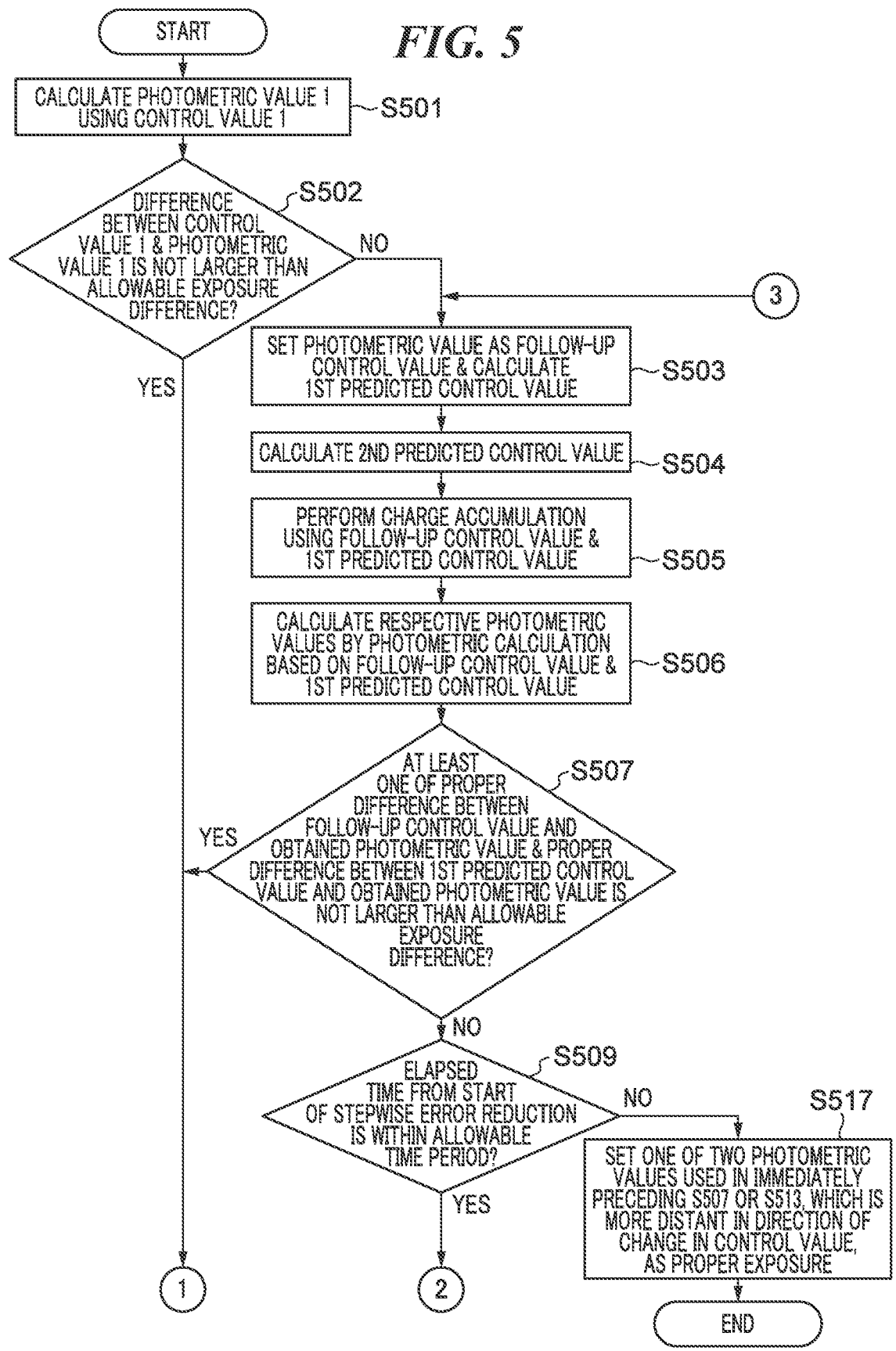
FIG. 5 is a flowchart of an exposure control process according to a second embodiment.
Figure 6:
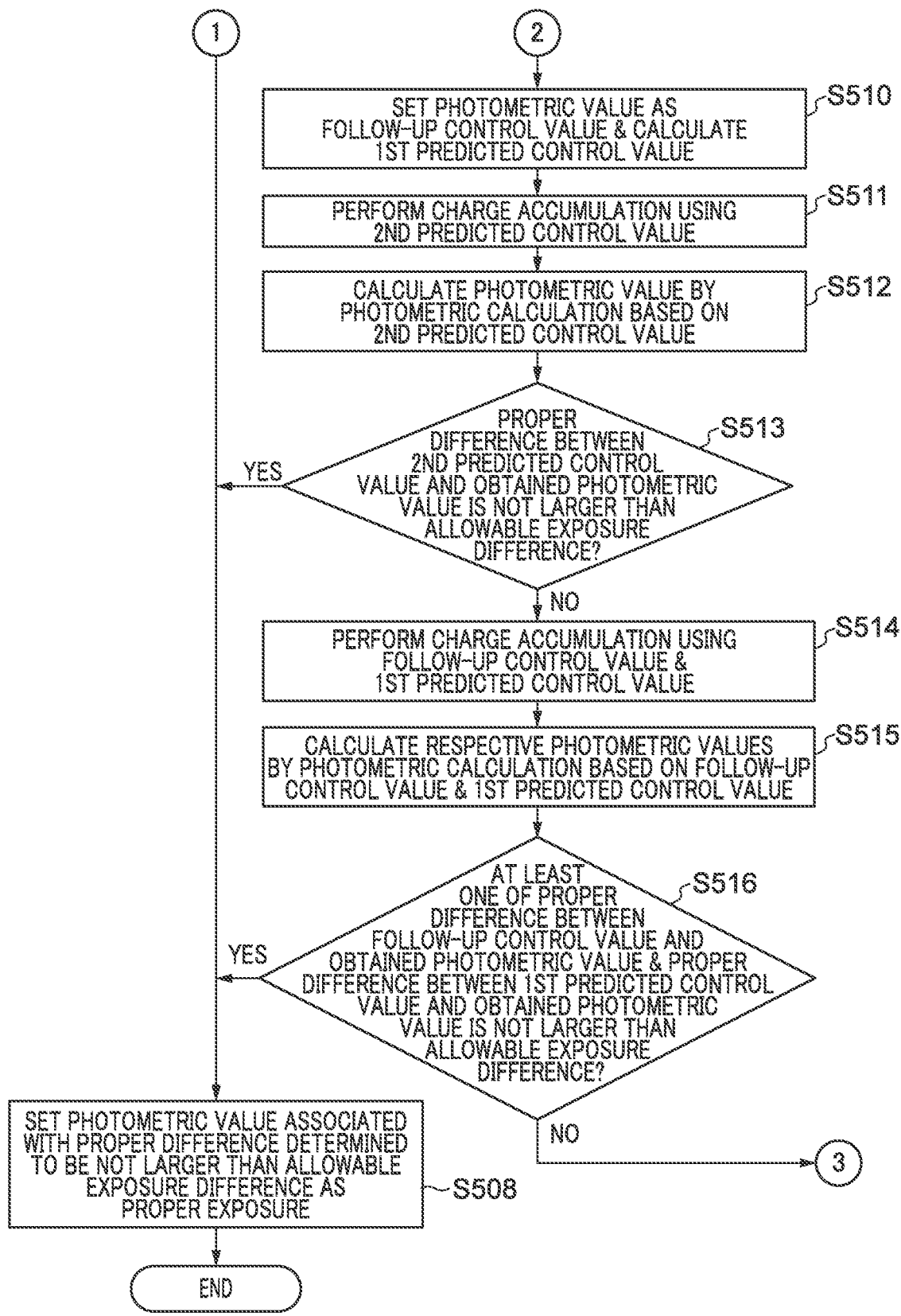
FIG. 6 is a continuation of FIG. 5.

Next, the exposure control method for the image capturing apparatus 100, according to a second embodiment, will be described with reference to FIGS. 5 to 7. FIGS. 5 and 6 are a flowchart of an exposure control process from the start of exposure follow-up to the determination of a proper exposure, by the exposure control method according to the second embodiment. The exposure control process in FIGS. 5 and 6 is realized by the camera controller 107 that executes a predetermined program and comprehensively controls the operations of the components of the image capturing apparatus 100. FIG. 7 is a timing diagram of the exposure control process according to the second embodiment.

Steps S501 to S503 are the same as the steps S301 to S303 of the flowchart in FIG. 3, described in the first embodiment, and hence description thereof is omitted. However, in the present embodiment, the predicted control value set in the step S503 is referred to as the "first predicted control value". Further, the first predicted control value set when the process proceeds from the step S502 to the step S503 is referred to as the "first predicted control value 3", and the process after the step S503 will be described, taking, as an example, a case where the process first proceeds from the step S502 to the step S503. Considering a case where the routine of the step S503 to a step S507 and a step S509 to a step S516 is repeated, in FIGS. 5 and 6, "photometric value", "follow-up control value", "first predicted control value", and "second predicted control value" are denoted without any suffix numbers.

In the step S504, the exposure controller 109 sets the second predicted control value 4. Assuming that the second predicted control value 4 is represented by $Bv_4$, the follow-up control value 2 by $Bv_S$, the control value 1 by $Bv'$ and the first predicted control value 3 by $Bv_3$, the second predicted control value 4 can be calculated by the following equation (3) using these values and the allowable value Diff:

$$Bv_4 = Bv_3 + 2 \times \frac{Bvs - Bv'}{|Bvs - Bv'|} \times Diff \quad (3)$$

Since the second predicted control value 4 can be determined by calculation without using the photometric value 2 and the photometric value 3, it is unnecessary to wait for readout of electric charges accumulated using the follow-up control value 2 and the first predicted control value 3, and photometric calculation. In the second embodiment, as shown in FIG. 7, charge accumulation using the follow-up control value 2 and charge accumulation using the second predicted control value 4 are performed within the same time period of a DV period next to the VD period in which the charge accumulation has been performed using the first predicted control value.

The steps S505 to S507 after the step S504 are the same as the steps S304 to S306 of the flowchart in FIG. 3, and hence, detailed description thereof is omitted, but in these steps, the photometric values using the follow-up control value 2 and the first predicted control value 3 are calculated, and determination concerning the proper differences is performed.

If it is determined that at least one of the proper difference between the follow-up control value 2 and the photometric value 2 and the proper difference between the first predicted control value 3 and the photometric value 3 is not larger than the allowable value Diff (YES to the step S507), the camera controller 107 proceeds to a step S508. The step S508 is the same as the step S307 of the flowchart in FIG. 3, and the camera controller 107 determines the photometric value associated with the proper difference determined to be not larger than the allowable value Diff as the proper exposure, followed by terminating the stepwise error reduction.

If it is determined that both of the proper difference between the follow-up control value 2 and the photometric value 2 and the proper difference between the first predicted control value 3 and the photometric value 3 are larger than the allowable value Diff (NO to the step S507), the camera controller 107 proceeds to the step S509. FIG. 7 shows a case in which the answer to the question of the step S507 is negative (NO), and therefore, charge accumulation using the second predicted control value 4 is performed and a photometric value 4 is calculated, as will be described hereinafter.

In the step S509, the camera controller 107 determines whether or not the elapsed time after the start of the stepwise error reduction is within an allowable time period. If it is determined that the elapsed time after the start of the stepwise error reduction is within the allowable time period (YES to the step S509), the camera controller 107 proceeds to the step S510.

The step S510 is the same as the step S303 executed when the answer to the question of the step S306 is negative (NO) and the process returns to the step S303 in the flowchart in FIG. 3. That is, one of the photometric value obtained using the follow-up control value and the photometric value obtained using the first predicted control value, used in the step S507 or the step S516, described hereinafter, which is more distant in the direction of change in the control value, is set as the next follow-up control value, and the next first predicted control value is calculated. The follow-up control value and the first predicted control value, set when the step S510 is executed first, are denoted as a follow-up control value 5 and a first predicted control value 6, respectively. Note that in the present embodiment, specifically, the photometric value obtained using the first predicted control value 3 is denoted as the follow-up control value 5.

In a step S511, the camera controller 107 performs charge accumulation using the second predicted control value 4. In a step S512, the exposure controller 109 calculates the photometric value 4 by photometric calculation based on the second predicted control value 4 and the result of charge accumulation performed using the same. In the step S513, the camera controller 107 determines whether or not the photometric value 4 is a proper exposure, i.e. whether or not the proper difference between the second predicted control value 4 and the photometric value 4 is not larger than the allowable value Diff. The determination method used in the step S513 is the same as that used in the step S507 (S306), and hence detailed description thereof is omitted.

If it is determined that the proper difference between the second predicted control value 4 and the photometric value 4 is not larger than the allowable value Diff (YES to the step S513), the camera controller 107 proceeds to the step S508. With this, the photometric value 4 is set as the proper exposure. If it is determined that the proper difference between the second predicted control value 4 and the photometric value 4 is larger than the allowable value Diff (NO to the step S513), the camera controller 107 proceeds to the step S514. FIG. 7 shows a case in which the answer to the question of the step S513 is negative (NO), and therefore, respective photometric values using the follow-up control value 5 and the first predicted control value 6 (photometric values 5 and 6) are calculated, as described hereinafter.

The steps S514 to S516 are substantially the same as the steps S505 to S507 (S304 to S306). That is, in the step S514, the camera controller 107 performs charge accumulation using the follow-up control value 5 and the first predicted control value 6. When the charge accumulation operations using the follow-up control value 5 and the first predicted control value 6 are completed, in a step S515, the exposure controller 109 calculates the photometric value 5 by photometric calculation based on the follow-up control value 5 and the result of charge accumulation using the follow-up control value 5, and further calculates the photometric value 6 by photometric calculation based on the first predicted control value 6 and the result of charge accumulation using the first predicted control value 6. In the step S516, the camera controller 107 determines whether or not at least one of the proper difference between the follow-up control value 5 and the photometric value 5 and the proper difference between the first predicted control value 6 and the photometric value 6 is not larger than the allowable value Diff.

If it is determined that at least one of the proper difference between the follow-up control value 5 and the photometric value 5 and the proper difference between the first predicted control value 6 and the photometric value 6 is not larger than the allowable value Diff (YES to the step S516), the camera controller 107 proceeds to the step S508. On the other hand, if it is determined that both of the proper difference between the follow-up control value 5 and the photometric value 5 and the proper difference between the first predicted control value 6 and the photometric value 6 are larger than the allowable value Diff (NO to the step S516), the camera controller 107 returns to the step S503. With this, the stepwise error reduction is continued.

The method of setting the follow-up control value and the first predicted control value when the process returns from the step S516 to the step S503 follows the processing in the step S510. Note that after the process returns from the step S516 to the step S503, it is considered that the photometric value obtained by that time has become close to the proper exposure, and hence the steps S504 and S511 to S513 may be skipped (not to set the second predicted control value).

FIG. 7 shows a case in which the proper difference between the first predicted control value 6 and the photometric value 6 is determined to be not larger than the allowance value Diff, and the photometric value 6 is set as the proper exposure. Although not shown, for example, in a case where the first determination result of the question of the step S513 is affirmative (YES), it is possible to set the photometric value 4 as the proper exposure before completing charge accumulation using the follow-up control value 5 and the first predicted control value 6, and terminates the stepwise error reduction. In other words, by setting a plurality of predicted control values, it is possible to reduce time required to perform the stepwise error reduction.

Incidentally, if it is determined in the step S509 that the elapsed time after the start of stepwise error reduction is longer than the allowable time period (NO to the step S509), the camera controller 107 proceeds to a step S517. In the step S517, the camera controller 107 sets one of the photometric value obtained using the follow-up control value and the photometric value obtained using the first predicted control value, which were used in the immediately preceding step S507 or S516, which is more distant in the direction of change in the control value, as the proper exposure, followed by terminating the present process.

As described above, in the first embodiment, the stepwise error reduction is performed by setting a follow-up control value and a predicted control value with respect to the original control value, whereby it is possible to reduce the time required to reach the proper exposure. Further, in the second embodiment, the stepwise error reduction is performed by setting a follow-up control value and two predicted control values with respect to the original control value, whereby it is possible to further reduce the time required to reach the proper exposure.

In the present embodiment, it is aimed to calculate the proper exposure, and hence charge accumulation is not stopped even after the stepwise error reduction is terminated. However, in a case where an instruction that largely changes the sequence (such as a photographing instruction) is input via the operation section 108, the photometry being executed may be stopped to set an optimum photometric value at the time point when the instruction is input, as the proper exposure, and then the operation may be shifted to the image capturing operation.

Further, although in the present embodiment, it is assumed that one follow-up control value and one predicted control value can be set within one VD period, in a case where a plurality of predicted control values can be set within one VD period, the plurality of predicted control values may be acquired within one VD period based on the allowable value Diff. In this case, the predicted control value $Bv_{pi}$ newly set within one VD is calculated by the following equation (4) such that it changes from the predicted control value $Bv_{pi-1}$, set immediately before, with a width of change which is twice the allowable value Diff:

$$Bv_{pi} = Bv_{pi-1} + 2 \times \frac{Bvx - Bv'}{|Bvs - Bv'|} \times \text{Diff} \quad (4)$$

Then, in a case where a plurality of predicted control values are set, the predicted control value $Bv_{pi}$ may be set by calculating by the following equation (5) such that it changes in a direction opposite to a direction of change of the follow-up control value $Bv_S$ so as to be capable of coping with a sudden change of a luminance of an object:

$$Bv_{pi} = Bv_S - 2 \times \frac{Bvs - Bv'}{|Bvs - Bv'|} \times \text{Diff} \quad (5)$$

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-123846, filed Jul. 20, 2020, which is hereby incorporated by reference herein in its entirety.

What is claimed is:

1. An image capturing apparatus including:
   an image capturing device that is capable of performing a plurality of charge accumulation operations within the same time period of a vertical synchronization signal;
   a drive control unit configured to control driving of the image capturing device; and
   an exposure control unit configured to obtain a proper exposure using image signals output from the image capturing device,
   the exposure control unit comprising:
   a setting unit configured to set, based on a photometry result obtained using a current control value, a follow-up control value and a first predicted control value which is more distant from the current control value than the follow-up control value in a direction of change from the current control value to the follow-up control value, for performing charge accumulation operations in the image capturing device within the same time period of the vertical synchronization signal;
   a determination unit configured to determine whether or not at least one of a proper difference between the follow-up control value and a photometric value as a photometry result obtained using the follow-up control value and a proper difference between the first predicted control value and a photometric value as a photometry result obtained using the first predicted control value is not larger than a predetermined allowable value; and
   a decision unit configured to decide a photometric value associated with a proper difference not larger than the predetermined allowable value as a proper exposure,
   wherein the current control value is an initial value or one of the photometric values obtained using the follow-up control value and the first predicted value, respectively, in a case where the proper differences are both larger than the predetermined allowable value.

2. The image capturing apparatus according to claim 1, wherein the drive control unit performs readout of electric charges accumulated using the first predicted control value prior to readout of electric charges accumulated using the follow-up control value.

3. The image capturing apparatus according to claim 1, wherein the setting unit sets a second predicted control value which is more distant from the current control value than the first predicted control value in the direction of change from the current control value to the follow-up control value.

4. The image capturing apparatus according to claim 1, wherein the setting unit sets a second predicted control value in an opposite direction to the direction of change from the current control value to the follow-up control value.

5. The image capturing apparatus according to claim 3, wherein the drive control unit performs charge accumulation using the second predicted control value in a time period coming next after the same time period of the vertical synchronization signal during which charge accumulation has been performed using the follow-up control value and the first predicted control value.

6. The image capturing apparatus according to claim 3, wherein in a case where both of the proper difference between the follow-up control value and the photometric value as the photometry result obtained using the follow-up control value and the proper difference between the first predicted control value and the photometric value as the photometry result obtained using the first predicted control value are larger than the predetermined allowable value, and also a proper difference between the second predicted control value and a photometric value as a photometry result obtained using the second predicted control value is not larger than the predetermined allowable value, the decision unit decides the photometric value obtained using the second predicted control value as a proper exposure.

7. The image capturing apparatus according to claim 3, wherein the setting unit sets the second predicted control value based on an allowable value of AE accuracy and an allowable exposure difference between a control value determined from a dynamic range of the image capturing device and a photometric value.

8. The image capturing apparatus according to claim 1, wherein the setting unit sets the first predicted control value based on an allowable value of AE accuracy and an allowable exposure difference between a control value determined from a dynamic range of the image capturing device and a photometric value.

9. The image capturing apparatus according to claim 1, wherein in a case where a proper exposure is not determined before a predetermined time period elapses after setting of the first follow-up control value, the decision unit decides a photometric value obtained using a follow-up control value set at the time of lapse of the predetermined time period, as a proper exposure.

10. The image capturing apparatus according to claim 1, wherein in a case where a photographing instruction is input, the decision unit decides an optimum photometric value obtained at the time of input of the photographing instruction, as a proper exposure.

11. An image capturing apparatus comprising:
an image capturing device;
a drive control unit configured to control driving of the image capturing device;
a photometry unit configured to perform photometry based on signals obtained by performing charge accumulation using the image capturing device; and
an exposure control unit configured to control an exposure control value at the time of image capturing of an object using the image capturing device,
wherein the drive control unit controls driving of the image capturing device such that in one frame period between successive synchronization signals, charge accumulation is performed at a first timing synchronized with a synchronization signal and at a second timing different from the first timing, and that first charge accumulation performed at the first timing and second charge accumulation performed at the second timing are executed in different areas of the image capturing device, and
wherein in a case where a photometry result based on signals obtained by the first charge accumulation is not a proper exposure, the exposure control unit determines, in the next frame period, an exposure control value at the time of image capturing of the object, using results of photometry performed by the photometry unit based on signals obtained by the first charge accumulation and signals obtained by the second charge accumulation.

12. The image capturing apparatus according to claim 11, further comprising a determination unit configured to, when an exposure control value at the time of image capturing of the object is set, perform comparison between a first photometry result based on signals obtained by charge accumulation using the image capturing device and the exposure control value, to thereby determine whether or not the first photometry result is a proper exposure, and
wherein in a case where it is determined by the determination unit that the first photometry result obtained by charge accumulation performed in a first frame period is a proper exposure, the exposure control unit changes the exposure control value at the time of image capturing of the object to an exposure control value based on the first photometry result.

13. The image capturing apparatus according to claim 12, wherein in a case where it is determined by the determination unit that the first photometry result is not a proper exposure, the photometry unit obtains a second photometry result based on signals obtained by the first charge accumulation and a third photometry result based on signals obtained by the second charge accumulation, in a second frame period coming next after the first frame period.

14. The image capturing apparatus according to claim 13, wherein the exposure control unit determines an exposure control value at the time of performing the first charge accumulation for obtaining the second photometry result, based on the first photometry result, and makes an exposure control value at the time of performing the second charge accumulation for obtaining the third photometry result different from the exposure control value based on the first photometry result.

15. The image capturing apparatus according to claim 11, wherein the drive control unit performs readout of signals from the image capturing device based on the first charge accumulation and the second charge accumulation, which are performed within the same frame period, at different timings, respectively.

16. A method of controlling an image capturing apparatus including an image capturing device that is capable of performing a plurality of charge accumulation operations within the same time period of a vertical synchronization signal,
wherein a process for determining a proper exposure using image signals output from the image capturing device comprises:
setting, based on a photometry result obtained using a current control value, a follow-up control value and a first predicted control value which is more distant from the current control value than the follow-up control value in a direction of change from the current control value to the follow-up control value, for performing charge accumulation operations in the image capturing device within the same time period of the vertical synchronization signal;
determining whether or not at least one of a proper difference between the follow-up control value and a photometric value as a photometry result obtained using the follow-up control value and a proper difference between the first predicted control value and a photometric value as a photometry result obtained using the first predicted control value is not larger than a predetermined allowable value; and
deciding a photometric value associated with a proper difference not larger than the predetermined allowable value as a proper exposure, and
wherein the current control value is an initial value or one of the photometric values obtained using the follow-up control value and the first predicted value, respectively, in a case where the proper differences are both larger than the predetermined allowable value.

17. A method of controlling an image capturing apparatus including an image capturing device, comprising:
controlling driving of the image capturing device; and
controlling an exposure control value at the time of image capturing of an object using the image capturing device,
wherein the controlling of the driving includes performing, in one frame period between successive synchronization signals, charge accumulation at a first timing synchronized with a synchronization signal and at a second timing different from the first timing, and also executing first charge accumulation performed at the first timing and second charge accumulation performed at the second timing, in different areas of the image capturing device, and
wherein the controlling of the exposure control value includes, in a case where a photometry result based on signals obtained by the first charge accumulation is not a proper exposure, determining, in the next frame period, an exposure control value at the time of image capturing of the object, using results of photometry performed based on signals obtained by the first charge accumulation and signals obtained by the second charge accumulation.

18. A non-transitory computer-readable storage medium storing a program for causing a computer to execute a method of controlling an image capturing apparatus including an image capturing device that is capable of performing a plurality of charge accumulation operations within the same time period of a vertical synchronization signal,
wherein a process for determining a proper exposure using image signals output from the image capturing device comprises:

setting, based on a photometry result obtained using a current control value, a follow-up control value and a first predicted control value which is more distant from the current control value than the follow-up control value in a direction of change from the current control value to the follow-up control value, for performing charge accumulation operations in the image capturing device within the same time period of the vertical synchronization signal;

determining whether or not at least one of a proper difference between the follow-up control value and a photometric value as a photometry result obtained using the follow-up control value and a proper difference between the first predicted control value and a photometric value as a photometry result obtained using the first predicted control value is not larger than a predetermined allowable value; and deciding a photometric value associated with a proper difference not larger than the predetermined allowable value as a proper exposure, and wherein the current control value is an initial value or one of the photometric values obtained using the follow-up control value and the first predicted value, respectively, in a case where the proper differences are both larger than the predetermined allowable value.

19. A non-transitory computer-readable storage medium storing a program for causing a computer to execute a method of controlling an image capturing apparatus including an image capturing device, comprising:

controlling driving of the image capturing device; and controlling an exposure control value at the time of image capturing of an object using the image capturing device, wherein the controlling of the driving includes performing, in one frame period between successive synchronization signals, charge accumulation at a first timing synchronized with a synchronization signal and at a second timing different from the first timing, and also executing first charge accumulation performed at the first timing and second charge accumulation performed at the second timing, in different areas of the image capturing device, and wherein the controlling of the exposure control value includes, in a case where a photometry result based on signals obtained by the first charge accumulation is not a proper exposure, determining, in the next frame period, an exposure control value at the time of image capturing of the object, using results of photometry performed based on signals obtained by the first charge accumulation and signals obtained by the second charge accumulation.

* * * * *